Jan. 1, 1963 S. I. RAMBO 3,071,731
CIRCUIT FOR GENERATING SINE SQUARED PULSE
Filed Oct. 1, 1958

WITNESSES
John E. Healy, Jr.
James F. Young

INVENTOR
Sheldon I. Rambo
BY
ATTORNEY

United States Patent Office 3,071,731
Patented Jan. 1, 1963

3,071,731
CIRCUIT FOR GENERATING SINE SQUARED PULSE
Sheldon I. Rambo, Baltimore, Md., assignor to Westinghouse Electric Corporation, East Pittsburgh, Pa., a corporation of Pennsylvania
Filed Oct. 1, 1958, Ser. No. 764,605
6 Claims. (Cl. 328—58)

This invention relates to a pulse generating apparatus, and more specifically, to such apparatus for generating a sine squared pulse.

In the past, radar systems have transmitted rectangular or trapezoidal pulses. Pulses of these shapes were generated for transmission in radar systems for two principal reasons. The first reason is that magnetron oscillators tended to mode unless rapid rise-time pulses were employed. Secondly, it has been assumed that the rectangular pulse had the greatest range resolution possibilities. Recently, however, driven klystrons and triodes or tetrodes have been employed replacing magnetrons so that the first reason for the use of rectangular or trapezoidal pulses no longer is important. In addition, studies have indicated that only a small loss of resolution results from use of sine squared pulses. Studies have indicated that the use of sine squared pulses in radar transmission greatly reduce side band splatter which interferes with other radar and communication systems. In addition, by employing sine squared pulses in this manner, with proper choice of receiver bandwidth, some improvement in signal to noise ratio has been realized.

It has been found that it is very difficult to generate accurately a sine squared pulse by either the line type or hard tube type modulators used for rectangular wave or trapezoidal generation.

Accordingly, it is an object of this invention to provide an apparatus for generating a pulse to be employed or transmitted in radar systems employing klystrons, triodes or tetrodes.

Another object of the invention is the provision of an apparatus for generating accurately a sine squared pulse.

A further object of the invention is to provide apparatus for generating a wave form of predetermined shape and duration from a single input pulse.

A still further object of the invention is the provision of an apparatus for producing a pulse having a predetermined wave form and of a predetermined duration from application of a single short trigger input pulse to the apparatus.

A still further object of the invention is to provide a modulator that produces a single sine squared pulse, for use in radar systems, in response to application of a single pulse being applied to the modulator.

The above-mentioned and other features and objects of this invention become more apparent by reference to the following description taken in conjunction with the accompanying drawings, in which.

Figure 1:
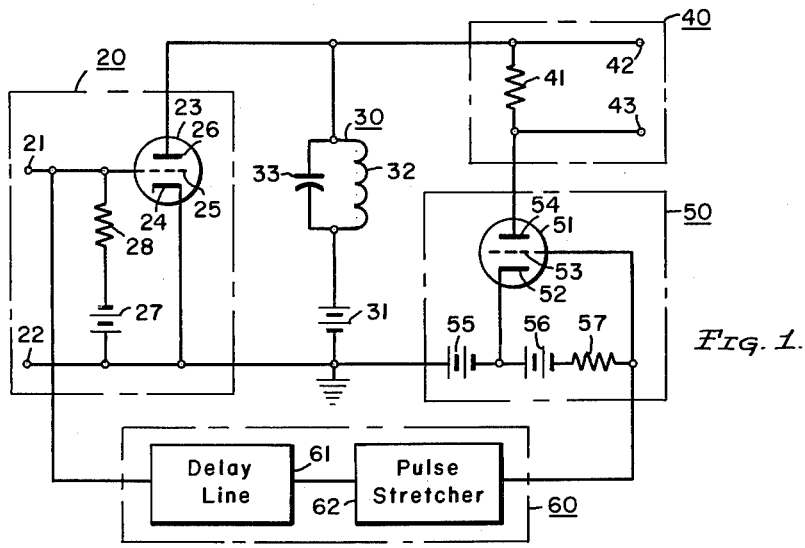
FIGURE 1 shows a diagram of a circuit employing an embodiment of my invention for generating a sine squared wave form.

Referring to FIG. 1, my invention consists generally of an input network 20 which effects application of a charging voltage to a tank oscillator 30 which, in turn, is connected in series with an output network 40 and a gate or switching means 50. The input network 20 is adapted to receive a short positive trigger pulse which is also transmitted through a delay switching or gating pulse circuit 60 that is connected to the gate 50 to render this gate conductive.

When a short positive pulse is applied to network 20, a charging circuit is closed to thereby supply a charging voltage to the oscillator 30. After the input pulse is removed from the input network 20, the oscillator continues to oscillate. The input pulse is also applied to the delay pulse circuit 60 wherein this pulse is delayed for one and one-fourth cycles or 450° of oscillation of oscillator 30 and additionally is stretched to a length equal to one cycle of oscillation of oscillator 30. Hence, as the oscillations continue, the gate 50 is rendered conductive a predetermined time after the application of the initial trigger pulse to the input network 20 and since this pulse is stretched before reaching gate 50, the gate 50 is rendered conductive for a predetermined time. When the gate 50 is rendered conductive the oscillations emanating from the oscillator 30 are reflected in the output network 40. However, the oscillator 30, the gate 50 and the output network 40 constitute a conversion circuit having selected values therein of voltage and resistance so that the pulse received at the output network is a sine squared pulse. The conversion circuit, including the oscillator 30, the output network 40 and the gate 50, is maintained conductive for exactly one full cycle by gate 50 so that the output presented at the output network 40 is a single sine squared pulse for each single input pulse.

FIG. 1 illustrates an embodiment of my invention comprising more specifically an input network 20 indicated by dotted lines in FIG. 1 and including input terminals 21 and 22, a vacuum tube 23 having a cathode 24, a signal grid or control electrode 25 and an anode 26. The input terminals 21 and 22 are adapted to receive a short trigger input pulse and are connected to the grid 25 and cathode 24, respectively, for transmitting this pulse thereto. The tube 23 is normally held cut-off or nonconductive by a direct current voltage supply 27 that is connected to grid 25 through a grid resistor 28. When a short positive trigger pulse is applied to the grid 25, the tube 23 is rendered conductive. A resonant or tank-type oscillator circuit 30 is connected between the anode 26 and cathode 24 through a direct current voltage source 31. The resonant circuit 30 comprises an inductor 32 and a capacitor 33 to constitute a conventional LC type oscillating circuit.

Thus, it is seen that the vacuum tube 23, the resonant circuit 30 and voltage source 31 constitute a charging circuit for the resonant circuit 30 when tube 23 is conductive. Hence, when a short positive trigger pulse is applied to the grid 25 of tube 23, tube 23 is rendered conductive and voltage source 31 thereby supplies the operating potential for charging the tank circuit 30. Thus, when a short trigger input pulse is applied to grid 25, tube 23 is rendered conductive and the resonant circuit 30 commences oscillation. The Q of the tank 30 is preferably made relatively high so that the resonant circuit will continue to oscillate at its resonant frequency long after the short trigger pulse has passed and the tube 23 returns to cutoff condition or non-conductive.

The negative side of the direct current voltage source 31 is connected to the positive side of a direct current voltage source 55. The anode side of the resonant circuit 30 is connected to a load resistance 41, and an output terminal 42 of output network 40, shown in dotted lines. Another output terminal 43 of network 40, is connected to the anode 54 of a gating vacuum tube 51 which has a cathode 52 and a control grid 53. The negative side of the direct current voltage source 55 is connected directly to the cathode 52. The vacuum tube 51 is normally held cutoff or non-conductive by a direct current voltage supply 56 connected to grid 53 through a grid resistor 57 and with the positive side connected directly to cathode 54. Hence, when tube 51 is rendered conductive, a conversion circuit will be closed which includes tank circuit 30, direct current supplies 31 and 55, vacuum tube 51 and load resistance 41 so that the oscillations emanating from the tank circuit 30 will impress a signal across the load resistance 41. As will be explained later, due to the characteristics of this circuit, the voltage developed across the load resistance 41 will be a sine squared wave form and will be a single sine squared pulse.

Figure 2:
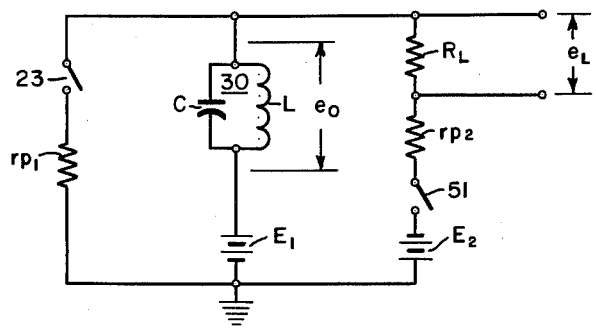
FIG. 2 shows schematically the equivalent circuit of the circuit shown in FIG. 1.

Thus, it is seen that gating tube 51, which is normally cutoff or in a non-conductive state acts as a switching means to effect application of an output voltage at the output terminals 42 and 43, when the gating tube 51 is rendered conductive. In order to render the gating tube 51 conductive in response to a single short trigger pulse, a delay switching circuit 60, shown in dotted lines in FIG. 2, is employed. This switching circuit is connected between the input terminals 21 and 22 and the control grid 53 of gating tube 51. Switching circuit 60 comprises a delay line 61 which acts to effect delay of transmission of the input signal to the grid 53 so that the commencement of the sine squared output pulse presented at the output terminals 42 and 43 can more accurately be determined relative to the oscillating voltage presented across tank circuit 30. After the input pulse passes through delay line 61, it is then fed into a pulse stretcher 62, the output of which is a pulse of predetermined duration and substantially longer than the initial short trigger pulse applied to the input terminals 24. The pulse stretcher 62 is employed so that the output pulse presented at output terminals 41 and 42 is accurately selected as a single cycle of oscillation. That is, the pulse stretcher 62 enables accurate conduction of the conversion circuit during precisely 360° or one cycle of current flow from the tank 30 (see FIG. 3). Further, as shown in FIG. 3, the use of the delay line 61 enables conduction of the conversion circuit commencing at a time, during the oscillation of tank 30, such that the output voltage presented at terminals 42 and 43 is one positive pulse.

Figure 3:
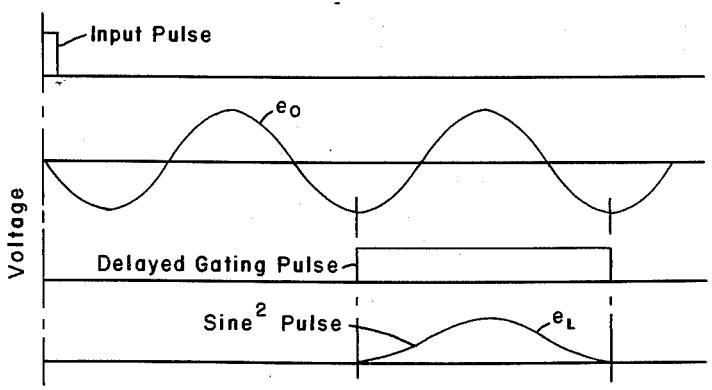
FIG. 3 is a coordinate graph illustrating voltage changes with respect to a time axis which appear in the operation of the circuit shown in FIGS. 1 and 2.

In the diagram shown in FIG. 3, conduction of the conversion circuit starts after 450° of oscillation of the tank 30. Beginning conduction at this time will bring optimum results with the components indicated below. However, as can be understood conduction could begin after $90° + n(360°)$ of oscillation of tank 30, where $n$ equals zero or any integer, provided, of course, tank 30 is still oscillating. The conduction of the conversion circuit including oscillator 30, gate 50 and output network 40, will continue for a full cycle or 360° of oscillation of oscillator 30. That is, if T is the frequency of oscillation of oscillator 30, the conversion circuit will be conductive for a time period of $1/T$ in length.

In a constructed embodiment of the invention, the following component values were used and the values are listed herein merely by way of example and not intended to limit the invention in any way.

Vacuum tubes 23 and 51 _____ 12AU7
Resistors 28, 41 and 57 _____kilo-ohms__ 100
Direct current voltage supply 27 _____volts__ 20
Direct current voltage supplies 31 and 55 _____volts__ 150
Direct current voltage supply 56 _____do____ 50
Capacitor 33 _____micromicrofarads__ 400
Inductor 32 _____millihenries___ 400

The circuit shown in FIG. 1 is reduced to its substantial equivalence by the diagram shown in FIG. 2. In FIG. 2, the tube 23 is reduced to a switch shown by numeral 23 and its linear plate resistance $r_{P1}$. The tank circuit 30 is represented by a capacitor C and inductance L. In addition $e_o$ represents the oscillating voltage across the tank circuit and $e_L$ represents the voltage developed across the output terminals and load resistances 41. In this equivalent diagram, the gating tube 51 is reduced to a switch illustrated by 51 and its linear plate resistance $r_{P2}$. Voltage supplies 31 and 55 are represented as $E_1$ and $E_2$, respectively. However, the delay switching circuit 60 is omitted from this diagram.

When the initial input pulse is removed from grid 25, after starting oscillation of tank 30, it can be said that switch 23 is open. Further, when the tube 51 is rendered conductive it can be said that switch 51 is closed.

With $i_L$ representing the current through $R_L$ and $E = E_1 = E_2$;

$$2E - 2E \sin \omega t + (R_L + r_{P2})i_L = 0$$

(since it has been found that $e_o = -2E \sin \omega t$ very nearly) with $$\omega^2 = \frac{1}{LC}$$

Then $$e_L = i_L R_L = -\frac{2ER_L}{R_L + r_{P2}}(1 - \sin \omega t)$$

$$= -\frac{2ER_L}{R_L + r_{P2}}\left(1 + \cos\left[\frac{\pi}{2} + \omega t\right]\right)$$

$$= -\frac{4ER_L}{R_L + r_{P2}} \cos^2\left(\frac{\pi}{4} + \frac{\omega t}{2}\right)$$

$$= -\frac{4ER_L}{R_L + r_{P2}} \sin^2\left(\frac{\pi}{4} - \frac{\omega t}{2}\right)$$

Thus, it is seen that the output voltage $e_L$ is a function of the sine wave form across tank 30, squared. As a result, the circuit components $E_1$, $E_2$, $R_L$ and $r_{P2}$ can be selected so that output signal across $R_L$ is a sine squared wave. The component values listed above were employed and the resulting output wave forms were sine squared pulses.

In the operation as shown in FIG. 3, an initial single positive input pulse is applied to the input terminals 21 and 22. This input pulse renders the tube 23 conductive so as to complete a charging circuit for the tank oscillator 30 and the tank is thereby charged by the voltage source 31 so as to initiate oscillations therein. The tank 30 has a relatively high Q so that after the positive input pulse is removed from the input terminals 21 and 22, and after the tube 23 is rendered non-conductive, the oscillator 30 continues to oscillate. The input pulse applied to the input terminals 21 and 22 is also applied through the delay line 61 and pulse stretcher 62 to render the gating tube 51 conductive. The delay line 61 delays application of the input pulse to the grid 52 for 450° of oscillation of tank 30 when tube 51 is then rendered conductive. As shown in FIG. 3, the effect of stretching the gating pulse is to apply oscillations across the load resistor 41 for exactly one cycle of oscillations of the tank 30. By delaying conduction of gating tube 51 for a predetermined time (as shown in FIG. 3 for 1¼ cycles), a single sine squared pulse is accurately and precisely selected to be applied to the load resistor 41. The conversion circuit constituting the tank 30, the output network 40 and the gate 50 have predetermined values so that the wave form applied across the load resistor 41 is a single pulse having a sine squared voltage variation. Thus, in the disclosed embodiment a single sine squared pulse is accurately produced that is precisely one cycle or 360° in duration. Further, this pulse is produced merely by application of a single input pulse to the input terminals.

Although the invention has been described in connection with certain specific embodiments, it should be readily apparent to those skilled in the art that various changes in the form and arrangement of parts may be made to suit requirements without departing from the spirit and scope of the invention.

I claim as my invention:
1. A pulse generating device comprising, input circuit means adapted to have an input pulse applied thereto, output terminals an oscillator operatively connected to said input circuit means to be set into oscillation by application of an input pulse to said input circuit means, said oscillator operatively connected to said output terminals for applying an output signal of predetermined wave form thereto, and switch means responsive to said input pulse and being operatively connected between said output terminals and said oscillator for effecting application of an output wave form from said oscillator after a predetermined time delay to said output terminals for a predetermined time duration.

2. Apparatus for producing an output signal having a sine squared wave form from a single input pulse signal comprising, input circuit means adapted to have an input pulse applied thereto, output terminals, an oscillator operatively connected to said input circuit means to be set into oscillation by application of an input pulse to said input circuit means, and switching means connected between said output terminals and said oscillator for effecting application of a sine squared waveform across said output terminals for a predetermined time in response to said input pulse.

3. Apparatus for producing an output signal having a sine squared wave form from a single input pulse signal comprising, input circuit means adapted to have an input pulse applied thereto, output terminals, an oscillator operatively connected to said input circuit means to be set into oscillation by application of a single input pulse to said input circuit means, switch means, and a delay switching circuit connected between said input circuit means and said switch means to effect closing of said switch means, in response to said input pulse, for a predetermined time and commencing at a predetermined time after the initial oscillation of said oscillator.

4. Apparatus for producing an output signal having a sine squared wave form from a single input pulse signal comprising, input circuit means adapted to have an input pulse applied thereto, output terminals, an oscillator operatively connected to said input circuit means to be set into oscillation by application of a single input pulse to said input circuit means, switch means operatively connected between said output terminals and said oscillator, a delayed switching circuit including a delay line and a pulse stretcher connected in series between said switch means and said input circuit means for rendering said switch means conductive for a predetermined time and commencing at a predetermined time after the initial oscillation of said oscillator, in response to application of said single input pulse signal to said input circuit means, and said delayed switching circuit being operative effecting closing of said switch means circuit at a predetermined time after the initial oscillation of said oscillation and for a period effected by said pulse stretcher.

5. A signal generating apparatus comprising, input circuit means adapted to have an input pulse applied thereto, output terminals, oscillator circuit means operatively connected to said input circuit means to be set into oscillation at a frequency of T by application of an input pulse to said input circuit means, switch means, a pulse stretcher and a delay means operatively connected between said input circuit means and said switch means, said pulse stretcher operative to stretch and said input pulse to a length of $1/T$ to effect closing of said switch means for a predetermined time $1/T$ and, with said delay means operative to effect commencing closure of said switch means at a predetermined time after the initial oscillation of said oscillator.

6. Apparatus for producing an output signal having a sine squared wave form from a single input pulse signal comprising, input circuit means, including a first electron discharge device, input terminals connected to said electron discharge device and adapted to have an input pulse applied thereto, capacitor means and inductor means operatively connected to form a resonant circuit, and being operatively connected to said first electron discharge device to be set in oscillation by application of an input pulse being applied to said electron discharge device, output terminals, a gating tube having at least a cathode, an anode and a control electrode, a delay switching circuit connected between said gating tube and said first electron discharge device including a delay line to render said gating tube conductive at a predetermined time after application of said input pulse to said input circuit means, said switching circuit including a pulse stretcher to effect the stretching of said single input pulse so as to render said gating tube conductive for a predetermined time, and with said resonant circuit and said gating tube being operative to present a sine squared pulse across said output terminals.

References Cited in the file of this patent

UNITED STATES PATENTS

| | | |
|---|---|---|
| 2,578,258 | McConnell | Dec. 11, 1951 |
| 2,730,624 | Hahnel | Jan. 10, 1956 |
| 2,873,311 | Sonnenfeldt | Feb. 10, 1959 |
| 2,920,191 | Rosenberg | Jan. 5, 1960 |